United States Patent [19]

Segal

[11] Patent Number: 4,995,767

[45] Date of Patent: Feb. 26, 1991

[54] FACE MILLING CUTTER WITH INDEXABLE INSERTS

[75] Inventor: Arthur R. Segal, Jasper, Ind.

[73] Assignee: North American Products, Corp., Jasper, Ind.

[21] Appl. No.: 502,833

[22] Filed: Apr. 2, 1990

Related U.S. Application Data

[63] Continuation of Ser. No. 256,055, Oct. 11, 1988, abandoned.

[51] Int. Cl.$^5$ .............................................. B26D 1/12
[52] U.S. Cl. ....................................... 407/41; 407/34; 407/30
[58] Field of Search ....................... 407/41, 34, 33, 30

[56] References Cited

U.S. PATENT DOCUMENTS

| | | | |
|---|---|---|---|
| 2,761,196 | 9/1956 | Graves et al. | 407/34 |
| 3,323,194 | 6/1967 | Greenleaf | 407/41 |
| 4,808,044 | 2/1989 | Tsujimura et al. | 407/41 |

Primary Examiner—Frederick R. Schmidt
Assistant Examiner—Lawrence Cruz
Attorney, Agent, or Firm—Nilles & Nilles

[57] ABSTRACT

The face milling cutter of this invention has indexable inserts with double-positive rake. Square inserts for a substantially 0° lead angle are insertable in the body interchangeably with different octagonal inserts that respectively provide for 15°, 30° and 45° lead every insert engages a radially outwardly facing relief surface on angles. One relief surface on the body that extends parallel to the cutter axis, and another engages an axially forwardly facing surface on a rear body member. The large area leading surface on each insert flatwise engages a circumferentially facing surface on the body that establishes the rake angles. Every insert has an operative cutting edge that is spaced radially outwardly from the body and has another and longer edge that is spaced axially fowardly from the front surface of the body and serves as a wiper land.

3 Claims, 2 Drawing Sheets

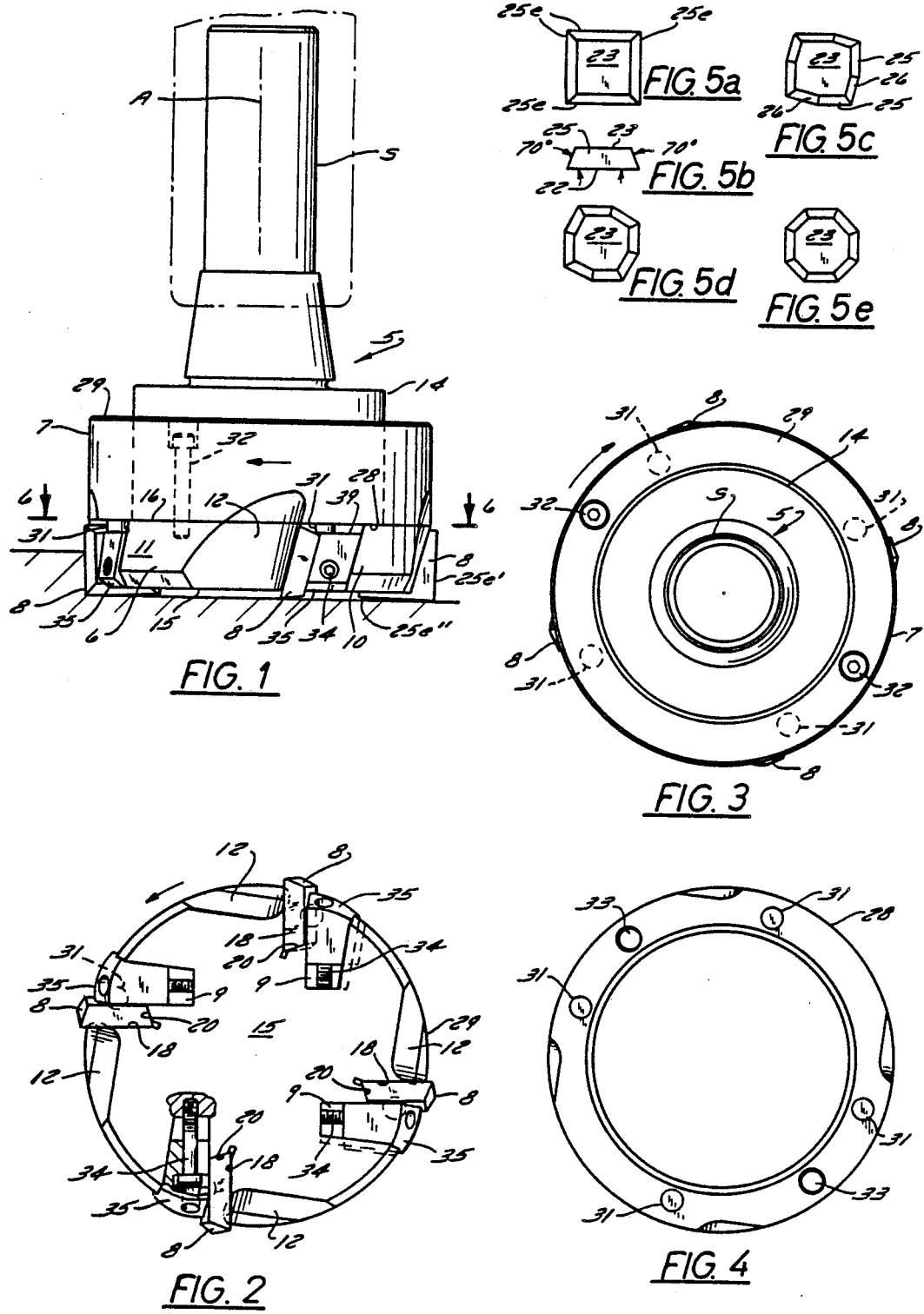

FACE MILLING CUTTER WITH INDEXABLE INSERTS

This application is a continuation of application Ser. No. 256,055, filed Oct. 11, 1988, now abandoned.

FIELD OF THE INVENTION

This invention relates to face milling cutters of the type comprising a cutter body wherein a plurality of identical indexable cutting inserts of a hard material such as carbide are detachably secured and whereby they are carried for orbital rotation; and the invention is more particularly concerned with a face milling cutter that cuts very fast but nevertheless produces a smooth finish and consumes relatively little power, said cutter comprising a versatile body which is adapted for use with any of a variety of indexable and resharpenable cutting inserts that provide for different lead angles and in which every such insert can be quickly and easily installed in exactly a desired position without the use of a gauging device.

BACKGROUND OF THE PRIOR ART

Face milling cutters with indexable cutting inserts have been known for a number of years and have come into widespread use because they minimize expensive downtime. An indexable cutting insert has a number of identical and alternatively usable straight cutting edges, so that when an operative one of those edges becomes dulled by use the insert can be indexed—removed from the cutter body and reinstalled therein in a different orientation—to bring a new one of those edges to the operative position.

An indexable cutting insert comprises a small block of metal having a pair of opposite larger surfaces that are flat and parallel to one another and having a plurality of smaller flat surfaces, one for each of the edges on the insert, each edge being defined by the intersection of a smaller flat surface with one of the larger ones. (Circular indexable cutting inserts, employed for certain special purposes, are not of interest in connection with the present invention.) By way of example, an indexable insert for cutting with positive rake may be triangular to have three edges, square to have four edges, or octagonal to have eight edges. In connection with the present invention the only insert geometries that are of interest are those that provide either four or eight straight edges, that is, inserts that are essentially square and octagonal.

In operation, a face milling cutter typically rotates on a fixed vertical axis and cuts into a workpiece near a top surface thereof as the workpiece is steadily fed in one horizontal direction in engagement with the cutter. In effect, the cutter somewhat reduces the height of the workpiece to provide it with a finished top surface area that is flat and lies in a plane exactly normal to the cutter axis. As the workpiece is fed in engagement with the cutter, cutting is effected by the peripheral edges on the inserts, which thus produce and successively cut into an arcuate shoulder that extends more or less vertically between the finished top surface and the unfinished one. The angle between this shoulder and the finished flat surface corresponds to the lead angle of the peripheral cutting edges of the inserts. Lead angle, sometimes referred to as the cut-entering angle, is the acute angle between the peripheral cutting edge on the insert and a parallel to the cutter axis which intersects that edge.

An indexable cutter insert is usually configured for one of a number of more or less standardized lead angles, namely: 45°, 30°, 15° and substantially 0°, the last mentioned including lead angles on the order of ½° to 3°, which are usually close enough to 0° for practical purposes. Apart from requirements that may be imposed by the need for a particular angle for the arcuate shoulder on the workpiece, the selection of lead angle is important because of its bearing on production economy. Other things being equal, the rate of feed of the workpiece can be increased with increasingly large lead angles; but the larger the lead angle, the smaller the possible depth of cut. Thus it is necessary to provide cutters with a full range of lead angles in order to accommodate all of the conditions and requirements likely to be encountered in face milling a variety of workpieces.

The present invention, which provides a face milling cutter having significant economic and functional advantages over those heretofore available, rejects certain heretofore accepted teachings in the face milling art. One of these has to do with a supposed necessary relationship between the cutter body and the lead angle of its inserts.

The following appears in §74 of "Milling with Indexable Inserts/Programmed Instruction", published by Fansteel-VR/Wesson (no date): "Body selection narrows the range of inserts that can be used. For example, the geometry of the body will determine the lead angle of the insert." Similarly, in "Milling Handbook of High-Efficiency Metal Cutting", copyrighted in 1980 by General Electric Company, the following appears at p. 17: "Selection of the right cutter body can often mean the difference between success and failure in a milling operation. The following are the factors which must be considered: . . . (5) Lead angle . . . "

Provision of a different cutter body for each different lead angle involved a costly inventory problem for a manufacturer of face milling cutter bodies who wanted to provide prompt delivery service. A given cutter body can have only one diameter, is specialized for either right-hand or left-hand cutting rotation, and can have only one combination of radial and axial rake angles. Thus, stocking a complete line of cutter bodies required at least one body for each of the several lead angles and their combinations and permutations with diameter, rotation direction and radial and axial rake angles. Bearing in mind that the cost of a cutter body is almost never less than $200, and is often several hundred dollars, the investment represented by such an inventory is very substantial. Reducing this variety to a small fraction of what it has heretofore been, by enabling a given cutter body to accommodate all of the standard lead angles, is very advantageous to users of face milling cutters as well as to manufacturers of them. Evidently it has not heretofore been obvious how this can be achieved.

Another of the heretofore accepted teachings that has been rejected for the purposes of the present invention relates to the radial and axial rake angles of the cutting inserts. As stated (in solid capital letters for strong emphasis) at p. 24 of the above mentioned General Electric publication: "Select double-negative cutters whenever the workpiece and machine tool will allow, unless positive tooling offers an economic advantage." The face milling cutter of the present invention uses positive radial rake and positive axial rake for all materials and milling conditions, thereby obtaining the economic and functional advantages heretofore recognized as available with double-positive rake—lower cutting forces and lower power consumption—but also achieving further important advantages that had not heretofore been expected, including reduction of cutter body inventory requirements, faster milling with smoother surface finishes, and longer useful life of the inserts between sharpenings.

For the body of the cuter of this invention certain conventional wisdom concerning the geometry of face milling cutter bodies is deliberately disregarded, and specifically the accepted teachings concerning cutter bodies for lead angles substantially larger than 0°. Heretofore the body of a cutter for a lead angle of 15°, 30° or 45° has usually had an overall diameter substantially greater than the effective diameter of the cutter. Such cutters were therefore not well suited for automatic tool changer installations, for which both the weight and the bulk of a cutting tool should be as small as possible. The cutter of the present invention has an unprecedented adaptability for use with automatic tool changers because—for every lead angle—its maximum body diameter is smaller than its effective diameter. As will appear from the following description, this favorable body geometry is one of the advantages resulting from the unconventional use of double-positive rake for all materials and milling conditions.

The cost of a set of cutting inserts for a face milling cutter is only a fraction of the cost of the body, and indexable inserts, because of their multiple alternatively usable cutting edges, provide especially favorable economy in terms of tool cost per cut. In fact, users of indexable inserts were heretofore given some encouragement to discard them when all of their cutting edges had been dulled by use, rather than having them resharpened. More recently the materials used in carbide milling cutter inserts have become relatively expensive, so that it is now notably wasteful to discard carbide inserts that are capable of being resharpened.

However, for computer-controlled milling machines, resharpening of face milling cutter inserts has heretofore presented an additional cost that has been significant. When an insert is resharpened, its size is somewhat reduced by reason of the removal of metal from it. If the insert is installed in a body that has a fixed surface which establishes its axial position relative to the body, resharpening effectively raises the operative cutting edge on the insert. If such a cutter is brought to a given axial position during a computer-controlled face milling operation, the cut that it makes with resharpened inserts is not quite as deep as the one it made with the same inserts before resharpening. It is not practical to reprogram the machine after each resharpening of inserts, and therefore cutter bodies intended for use with automatically controlled machines were usually arranged to require individual axial adjustment of the inserts as they were installed, to accommodate reduction in insert size due to resharpening. This was a tedious and time consuming process, requiring that each insert be lightly clamped in the body, then tapped with a mallet to shift it back and forth in the body, checking its position with a gauge after each such shift, until it was finally brought to exactly the desired position, whereupon it was clamped tight. Such adjustment of a set of inserts usually required several hours and thus involved costly labor time as well as unavailability of the cutter.

As pointed out above, the milling cutter body of this invention can be adapted for cutting at any selected lead angle by simply installing a different set of inserts in it whenever the lead angle is to be changed. Obviously, some of the advantages of this versatility would be sacrificed if every change of inserts entailed the tedious and laborious adjustment procedure just described. Thus the versatility contemplated by this invention requires the cutter body to be so configured and arranged as to provide for quick and easy installation of each of the several different inserts intended for cooperation with it, whereby each of the operative edges of every such insert is accurately disposed in a predetermined position and orientation. Furthermore, the body must provide for such facile installation of resharpened inserts as well as of those that are new, without need for tedious or difficult adjustment to compensate for the reduction in insert dimensions that results from resharpening.

Three prior U.S. patents are known to the applicant which hindsight can endow with a semblance of pertinence but which did not in fact offer a solution to the complex of problems addressed by this invention: Markstrum, U.S. Pat. No. 1,927,409 (1933); Connell, U.S. Pat. No. 2,351,491 (1944); and Begle et al, U.S. Pat. No. 2,690,610 (1954).

The cutting inserts disclosed by Markstrum are removable from the cutter body but are not indexable. Each insert is elongated to have a front end portion on which its cutting edge is formed, and it is installed in the body with its length at a marked forwardly and radially outwardly oblique inclination to the cutter axis. The cutter body has a rearwardly projecting, reduced diameter neck portion onto which a nut-like collar is threaded. The collar has a flat front surface that engages a rear end of each insert, so that rotation of the threaded collar to shift it forwardly along the neck effects a corresponding forward shift of all of the inserts. Because the inserts are lengthwise oblique to the cutter axis, their forward axial displacement also involves a radial component that increases the radius of their cutting edge orbits; but the ratio of radial to axial shifting may vary from insert to insert because of the way the inserts are mounted in the body. Each insert is received in a groove in the body that is radially outwardly divergent, and the insert tapers in thickness to have a wedging fit in the groove. Unless the groove surfaces and their mating surfaces on the inserts are machined with an almost unattainable precision, the cutting edges on the several inserts will be at different distances from the cutter axis, and because of this radial run-out the tool would have very poor cutting action. Notwithstanding such pertinence as it might seem to have in the light of the present invention, the Markstrum patent did not in fact teach the art how to overcome the problems solved by this invention, both because the cutter of that patent did not have indexable inserts and because it presented other and more troublesome problems that were not encountered by heretofore conventional cutters with indexable inserts.

Connell discloses two inserted tooth cutter embodiments, one a reamer, the other a milling cutter. Neither has indexable inserts. In the reamer, each insert-receiving slot in the body defines a flat, radially outwardly facing locating surface that is oblique to the body axis, being inclined forwardly and radially outwardly to it; and each of the inserts tapers in radial thickness along its length and engages this locating surface to be displaced radially outwardly in consequence of being shifted forwardly along it. As with the Markstrum device, the Connell reamer body has a rearwardly projecting neck onto which is threaded a collar that engages rear end portions of the inserts to provide for their simultaneous axial shifting. The milling cutter disclosed by Connell does not include the threaded adjusting collar that Connell provides for the reamer. Instead, the means for effecting axial positioning of the inserts requires each insert to be adjusted individually and involves a slot in each insert that would be incompatible with any practical indexable insert geometry.

Begle et al discloses two embodiments of indexable insert milling cutters, but both must be arranged for negative axial rake and negative radial rake and they are thus unsuitable for many industrially important nonferrous metals such as brass and aluminum. In the more nearly pertinent of the two embodiments disclosed by Begle et al, each cutting insert is an octagonal block having opposite and parallel flat faces and providing a total of 16 cutting edges. These octagonal inserts, which provide a 45° lead angle, closely correspond to present-day indexable inserts. The cutter body in which they are installed has fixed circumferential, radial and axial locating surfaces. In this connection the patent says: "It is contemplated that the cutting blades 52 be thrown away or discarded after all the sixteen cutting edges have been used; and if this is done, the necessity of grinding or adjusting the blades is entirely eliminated." As this statement implies, and as is apparent from the patent disclosure, the cutter body has no means for compensating for the reduced size of resharpened inserts, nor is the cutter suitable for other than a 45° lead angle.

The other milling cutter embodiment disclosed by Begle et al includes provision for individual axial adjustment of the inserts to accommodate resharpening, but in this case the inserts, although indexable, are substantially elongated and are thus materially different in shape from now-conventional indexable inserts. The cutter body that accommodates such inserts has great axial length and therefore has weight and bulk that are unsuitable for automatic tool changers.

SUMMARY OF THE INVENTION

The general object of this invention is to provide a face milling cutter that has a versatile body which is capable of accommodating a variety of different indexable cutting inserts to provide for cutting at any selected one of a variety of lead angles, and which is nevertheless light and compact to be well suited for use with automatic tool changer apparatus.

It is also a general object of the invention to provide a face milling cutter body wherein several different sets of indexable inserts can be interchangeably installed to provide for cutting with any desired lead angle, wherein every such insert can be quickly and easily installed with its operative edges accurately disposed in desired positions and orientations, and wherein resharpened inserts can be installed with the same facility as new ones and with their operative edges in the same positions and orientations that those edges had when the inserts were new, so that the cutter can be used in a numerically controlled machine without any need for reprogramming to accommodate resharpened inserts.

Another object of the invention is to provide a face milling cutter which attains the above stated objects with interchangeable indexable cutting inserts that can be readily resharpened and which cuts fast and cleanly but nevertheless operates on practically all types of materials in such a manner that the inserts have a long useful life between resharpenings.

It is also an object of this invention to provide a face milling cutter which achieves all of the above stated objects, which can be used on conventional milling machines without requiring any modification of such machines, and which cuts quickly while nevertheless drawing less power than heretofore conventional cutters that cut more slowly and produced a much rougher surface finish.

It will be apparent that it is an ultimate object of the present invention to reduce to a small fraction of its former magnitude the inventory of face milling cutter bodies that manufacturers and users of such tools must stock for promptly meeting all possible face milling requirements, thereby reducing overhead costs while at the same time greatly increasing the utility and versatility of cutter bodies to correspondingly increase the value of an investment in face milling equipment.

Along with the above stated objects of the invention, it is also an important general object of the invention to provide a face milling cutter having a compact, lightweight and versatile body capable of use with interchangeable indexable inserts to provide for cutting at any desired lead angle, which cutter is capable of cutting a wide variety of materials at very high feed rates and with modest power consumption while producing a very smoothly finished surface without the need for a specialized sweep wiper.

BRIEF DESCRIPTION OF THE DRAWINGS

In the accompanying drawings, which illustrate what are now regarded as preferred embodiments of the invention:

FIG. 1 is a view in side elevation of a face milling cutter embodying the principles of this invention;

FIG. 2 is a view of the cutter in front elevation, that is, as seen from what will usually be the bottom of it, with portions shown broken away;

FIG. 3 is a view in elevation of the cutter as seen from its top or rear end;

FIG. 4 is a view in front elevation of the rear body member;

FIG. 5a is a view of an indexable cutting insert that can be used with the cutter body of this invention for a substantially 0° lead angle, as seen from the rear of the insert relative to the direction of cutter rotation;

FIG. 5b is an edge-on view of the insert shown in FIG. 5a;

FIGS. 5c, 5d and 5e are views corresponding to FIG. 5a but showing inserts which are interchangeable with one another and with that of FIG. 5a to provide for lead angles of 15°, 30° and 45°, respectively;

DETAILED DESCRIPTION OF PREFERRED EMBODIMENTS OF THE INVENTION

Figure 6:
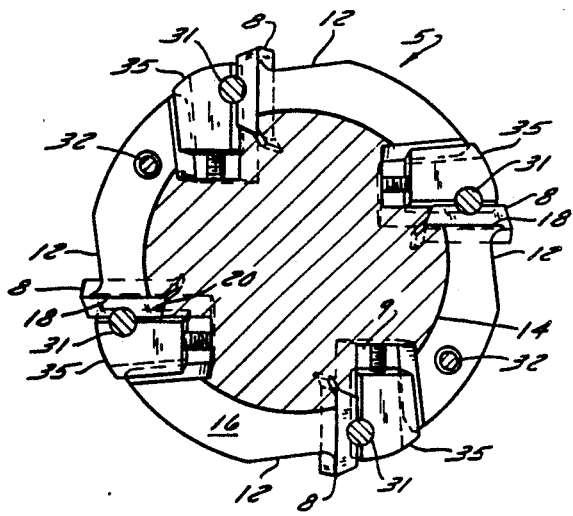
FIG. 6 is a view in section on the plane of the line 6—6 in FIG. 1.

A face milling cutter of this invention comprises a cutter body 5 which is intended for rotation in one direction about an axis A of the body that is usually upright when the cutter is in operation. The body 5 consists of a front member 6 and a concentric annular rear member 7, together with a plurality of identical indexable cutting inserts 8, each detachably secured in one of a like plurality of identical, circumferentially spaced recesses 9 in the front body member 6. The recesses 9 will usually be spaced at uniform circumferential intervals around the front body member 6. The cutter body of this invention is adaptable to irregular circumferential spacing of the recesses and the inserts seated in them, such as is sometimes employed to overcome severe vibration problems, but such irregular spacing is not likely to be needed. The number of inserts 8 carried by the cutter body will depend upon its diameter and the pitch of the cutter.

A spindle or arbor S, projecting concentrically rearwardly from the cutter body to provide for conventional mounting of the cutter in a milling machine, may be formed in one piece with the front member 6 or may be detachably connected to it.

The front body member 6 has a relatively large diameter front portion 10 in which the recesses 9 are formed. For the most part the peripheral surface 11 of this front portion 10 lies on a cylinder concentric with the axis A, but this cylinder (which defines the maximum overall diameter of the body itself) is interrupted by the recesses 9 and also by a bay-like chip slot 12 that is adajcent to each recess and ahead of it relative to the direction of rotation. As the description proceeds it will be seen that each of the different types of indexable cutting inserts 8 that are interchangeably usable with the body 5 projects a substantial distance radially beyond the cylinder just mentioned, so that the effective diameter of the cutter, for every lead angle, is substantially larger than the maximum diameter of the body.

Projecting rearwardly from the front portion 10 of the front member 6 is a concentric cylindrical neck portion 14 (FIGS. 1 and 3) which is of substantially smaller diameter than the front portion 10 and which is surrounded by the annular rear body member 7.

The front body member 6 has a front face 15 which can be flat and which will in any case define a plane normal to the axis A about which the cutter rotates; and it has a rear face 16, likewise preferably flat, which is axially opposite said front face and which surrounds the neck portion 14 at the front end of the latter. Preferably an axially short conical surface 17 extends between the front face 15 and each cylindrical portion of the peripheral surface 11.

Each of the recesses 9 in the front member 6 opens forwardly through its front face 15 and rearwardly through its rear face 16 as well as radially outwardly through its peripheral surface 11. Each recess defines on the front body member 6 two flat locating surfaces which are engaged by flat surfaces on an insert 8 received in the recess. One of these is a circumferential locating surface 18 which extends generally axially and radially and which thus faces substantially in one circumferential direction, preferably oppositely to the direction of rotation. The other is a flat and elongated radial locating surface 20 which faces away from the axis A and which is spaced from that axis and extends lengthwise substantially parallel to it. The annular rear body member 7 provides for axially adjustable support of the inserts 8, as explained hereinafter, and it thus cooperates with the locating surfaces 18 and 20 in fixing the position and orientation of each insert relative to the cutter body 5.

At this point attention is directed to the geometry of the cutting inserts 8 that cooperate with the cutter body of this invention. To provide for all of the standardized rake angles, the body can cooperate with each of four types of inserts that differ from one another as pointed out hereinafter, such inserts being installed in the body in sets, all of the inserts of a set being identical with one another.

Conventionally, the size of an indexable cutting insert is specified in terms of an inscribed circle, that is, the diameter of an imaginary circle IC (see FIG. 9) that can be inscribed within the alternatively usable edges on the insert. A cutter body embodying the principles of this invention is intended for use with inserts that are all of one predetermined inscribed circle diameter.

Every insert intended for a cutter of this invention has large opposite flat and parallel surfaces 22, 23 which are either square or octagonal depending upon the lead angle for which the insert is intended, and which are concentric with one another and have their corresponding edges parallel. One of these surfaces, designated by 22, is larger than the other and constitutes a leading surface which faces in the direction of rotation; the smaller one 23 is thus the trailing surface. In addition, every insert has four identical smaller flat surfaces 25 which are disposed at an acute angle (typically 70°) to the leading surface 22 and which constitute relief surfaces. Each of the relief surfaces 25 intersects the leading surface 22 to define thereon one of four identical edges 25e, each of which is tangent to the inscribed circle IC for the insert and extends at right angles to two of the other edges 25e.

An insert for a substantially 0° relief angle (FIG. 5a) has square leading and trailing surfaces 22, 23 and has only four edges 25e defined by four relief surfaces 25, each said edge 25e being of a length equal to the inscribed circle diameter (or if there are small corner radii, nearly equal to that diameter). Such an insert is installed in a cutter body with one of its four edges 25e substantially parallel to the cutter axis A and in radially outwardly spaced relation to the peripheral surface 11 of the body to serve as an operative cutting edge, as designated by 25e' in FIG. 1. An adjacent substantially radially extending edge that is spaced forwardly from the front face of the body (edge 25e" in FIG. 1) then serves as a wiper land which functions in a known manner to produce a smooth finish on the surface cut by the tool.

Figure 9:
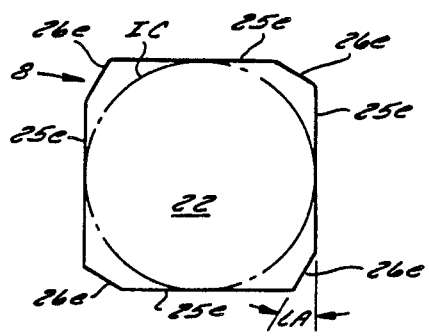
FIG. 9 is a view of an insert for cutting with a lead angle substantially larger than 0°, as seen from in front of the insert relative to the direction of rotation.
Figure 7:
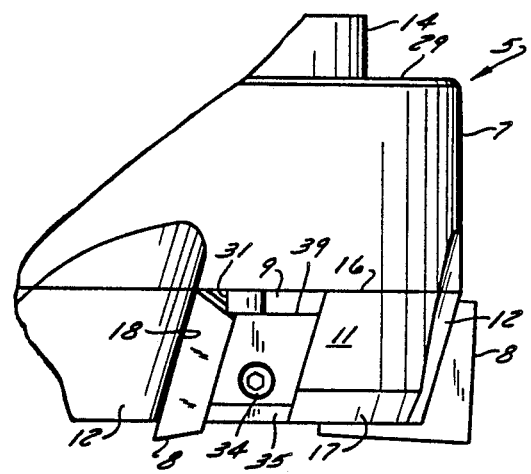
FIG. 7 is a fragmentary view in side elevation, on a larger scale than FIG. 1.
Figure 8:
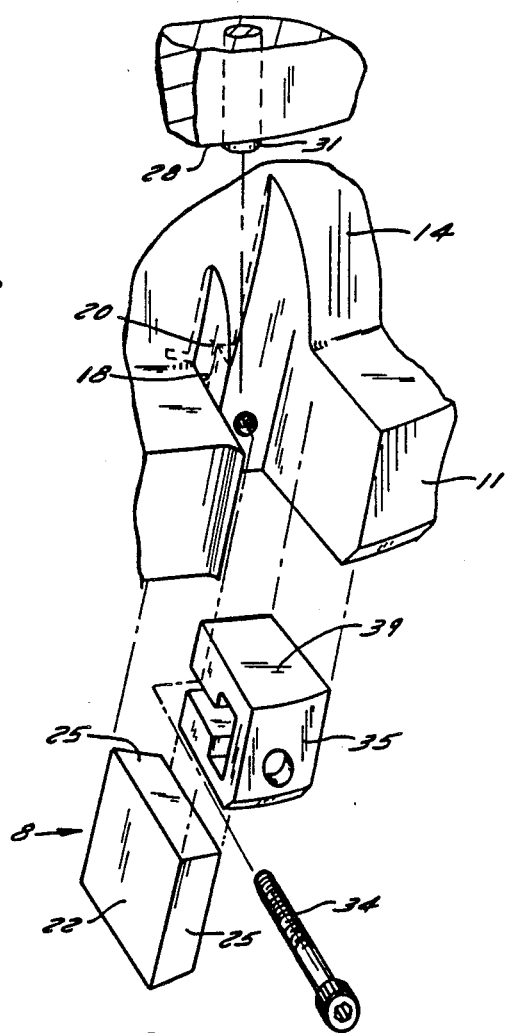
FIG. 8 is a fragmentary disassembled perspective view of a cutting insert in relation to a portion of the cutter body and a cooperating insert clamp whereby the insert is releasably fixed in a predetermined position and orientation in the cutter body.
Figure 10:
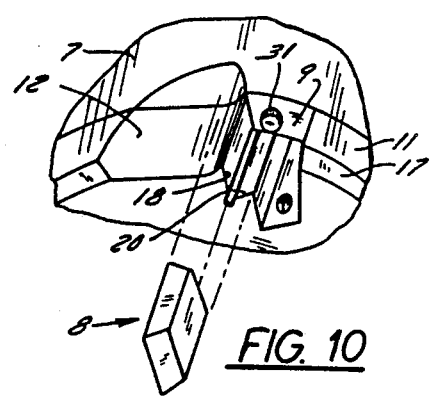
FIG. 10 is a fragmentary perspective view looking obliquely rearwardly into one of the insert recesses.

An insert for a lead angle of substantially more than 0° is octagonal. In addition to the four relief surfaces 25 it has four further relief surfaces 26 that are disposed at the same acute angle to the leading surface 22 as the relief surfaces 25, and each of these relief surfaces 26 intersects the leading surface to define thereon a cutting edge 26e. As can be seen in FIG. 9—which typifies all inserts for lead angles of substantially more than 0°— each cutting edge 26e is spaced radially outwardly from the inscribed circle IC for the insert and is therefore substantially shorter than the edges 25e that are tangent to said circle. Each of the longer edges 25e therefore has a length which is shorter than the diameter of the inscribed circle but is at least equal to half of that diameter, and each such longer edge is available to serve as a wiper land which, because of its substantial length, produces a smoothly finished cut, even at high feed rates. The cutting edges 26e alternate around the octagonal leading surface 22 with the longer wiper edges 25e, and each cutting edge makes with an adjacent wiper edge 25e an angle LA that is equal to the lead angle for which the insert is intended. Each cutting edge 26e extends at right angles to two of the other cutting edges and is parallel to still another of them, so that the octagonal leading surface of the insert can be regarded as having four identical quadrants, in each of which there is a cutting edge 26e and a wiper edge 25e.

Returning now to a consideration of the cutter body 5, the elongated radial locating surface 20 that is defined by each recess 9 in the front member 6 is adapted to be engaged by one of the relief surfaces 25 on an insert. Each radial locating surface extends lengthwise from the front face 15 to the rear face 16 on the front body member 6. Note that in the case of an octagonal insert (FIGS. 5c, 5d, 5e and 9) the relief surface 25 that engages this radial locating surface 20 defines one of the longer wiper edges 25e on the insert; and hence substantial areas of surface on the insert and on the body are flatwise engaged for secure and stable establishment of the radial position of the insert. The several radial locating surfaces 20 on the body 5 are uniformly spaced from the axis A, face generally away from it, and are substantially parallel to that axis, although in the preferred case here illustrated each such surface converges lengthwise forwardly towards the axis A at a very small angle, typically $\frac{1}{2}°$. Each radial locating surface is spaced from the axis by a distance which is equal to one-half of the effective diameter of the cutter minus the inscribed circle diameter of the inserts for the cutter; and since the maximum diameter of the cutter body is smaller than the effective diameter of the cutter, the radial locating surfaces 20 thus position the inserts—both square and octagonal—with their operative cutting edges in substantial radially outwardly spaced relation to the peripheral surface 11 of the body. Because the inserts have this substantial radial overhang relative to the body, they can be resharpened repeatedly and still be available for use with the body.

Conventional wisdom concerning milling cutters seems to suggest that such large radial overhang of the inserts, which tends to leave their operative edge portions unsupported, invites breakage of the inserts, especially since the cutter of this invention has double-positive rake. It has been the belief that the inserts of double-negative cutters can withstand higher cutting forces, since positive rake inserts require the transverse rupture strength of the cutting material to support a large portion of the forces of the cut, whereas double-negative cutters are subjected to a mainly compressive load and the compressive strength of a carbide insert is about $2\frac{1}{2}$ times greater than its transverse rupture strength. See p. 25 of the above cited General Electric publication. In fact, however, it has been found that the cutting forces imposed upon double-positive inserts, even at high feed rates and large depths of cut, are so much lower than those imposed upon double-negative inserts that this matter of transverse rupture strength is not of great significance. (It might be noted that the substantially lower cutting forces make for correspondingly lower power consumption for a double-positive cutter.) Furthermore, the shearing forces on a double-positive cutter are imposed nearly parallel to the relief surface that defines its cutting edge, so that the effective thickness of such an insert that accounts for its transverse rupture strength is greater than its actual thickness between its leading and trailing surfaces. Experience with cutters of this invention has confirmed that the positive-positive rake inserts are less likely to break than a double-negative insert, which can be shown to have a lower effective transverse rupture strength adjacent to its operative cutting edge, where the insert is in fact subjected to a high component of shearing force as well as the recognized component of compressive force.

Because of the double-positive rake, the full length of the operative cutting edges 26e of the inserts can be used, in contrast to the conventional "rule" that "the maximum depth of cut should be no more than $\frac{3}{4}$ of the available cutting edge length" (p. 41 of the General Electric publication). Thus, even though the cutting edges 26e on the octagonal inserts for the cutter of this invention appear to be relatively short, an insert of a given inscribed circle size is capable of a depth of cut that compares favorably with heretofore conventional inserts of the same IC size.

The double-positive rake of the cutter of this invention is of course established by the circumferential locating surface 18 that is defined by each recess 9. Each such surface 18 extends axially through the full distance between the front face 15 and the rear face 16 of the cutter body front member, and extends radially from the radial locating surface 20 to the peripheral surface 11. It thus offers a large area for flatwise engagement by one of the large surfaces 22, 23 on an insert, preferably the leading surface 22. Relative to an imaginary plane which contains the axis A and which extends radially therefrom to intersect the radial locating surface 20, that surface 18 is inclined in the direction of rotation both radially outwardly, for positive radial rake, and axially forwardly, for positive axial rake. Typically the radial rake angle is 10° positive and the axial rake angle is 15° positive, for a true positive rake angle of 17°46'.

The rear body member 7, which serves to establish the axial positions of the inserts 8 in the cutter body, is a ring which has an outside diameter equal to that of the peripheral surface 11 and which has an inside diameter to fit closely but slidably around the neck portion 14 of the front body member 6. It has accurately flat and parallel front and rear surfaces 28 and 29, respectively. Projecting forwardly from its front surface 28 are a number of circumferentially spaced abutment elements 31, one for each insert receiving recess 9 in the body, each adapted to be engaged by a rearwardly facing relief surface 25 on an insert, for axial positioning of the insert. Each abutment element 31 consists of a short length of drill rod or the like that is snugly received in a well which opens to the front surface 28 of the rear member. The annular rear member 7 is securely but removably fixed to the front member 6 by means of a pair of socket-head bolts 32 which extend axially forwardly through bores 33 in the rear member, at diametrically opposite locations on it, and which are threaded into the large diameter front portion 10 of the front member. These bolts 32 maintain the flat front surface 28 of the rear member in flatwise engagement with the rear face 16 on the front member, thus establishing a predetermined distance between the front end surface on each abutment element 31 and the front face 15 of the body, which distance is of course smaller than the inscribed circle diameter of the inserts 8 for the body.

Because the front and rear surfaces 28, 29 of the rear body member are flat and parallel to one another, a simple grinding operation or the like, performed on the abutment elements 31 with the rear member disassembled from the rest of the body, can ensure that the front end surfaces of all of the elements 31 lie in a common plane which is parallel to the front surface 28 of the rear member and is spaced forwardly therefrom by a predetermined distance. Because of the simple geometry of the cutting inserts 8, it is relatively easy to sharpen or resharpen all inserts of every set to identical dimensions, hence the arrangement of abutment elements 31 on the rear member 7 ensures that the operative wiper edges of all inserts of each set will be in uniform forwardly spaced relation to the front face 15 of the cutter body.

When a cutter of this invention is intended for use on an automatically controlled machine, it can be initially provided with a shim (not shown) between the flat rear face 16 on the front member and the flat front face 28 on the annular rear member, which shim has a thickness equal to the reduction in IC size of the inserts that results from resharpening. When resharpening is needed, all inserts of every set used with the body are resharpened, so that all of them will have the same new and reduced inscribed circle size, and the shim is removed from the body to move the rear member 7 and its abutment elements 31 forward by a distance which just compensates for the reduction in inscribed circle diameter of the resharpened inserts. The operative wiper and cutting edges of the resharpened inserts are thus established in the same axial positions relative to the body front face 15 that those edges had when the inserts were new.

It will be apparent that, for each recess 9, the circumferential locating surface 18, the radial locating surface 20 and the front surface of the abutment element 31 cooperate to establish any insert for the recess in exactly a predetermined position and orientation relative to the body when the insert is simply brought into firm engagement with those surfaces. Each insert is releasably locked into its recess, in firm engagement with the three surfaces that establish its location and orientation, by means of a generally conventional insert clamp which applies force to the insert in the direction to clamp it against the circumferential locating surface 18 and which therefore engages the trailing surface 23 of the insert in preferred arrangements. The insert clamp for each recess comprises a clamping screw 34 that is threaded into the front body member 6.

In its simplest form, which is not illustrated because it is satisfactory only for relatively small diameter cutter bodies, the insert clamp consists of only the clamping screw, which is threaded into the front body member with its length extending in a substantially circumferential direction and with its tip directly engaging the insert.

In its preferred form the insert clamp for each recess 9 comprises a generally conventional wedge 35 which tapers radially inwardly and which is received in the recess with one of its opposite wedging surfaces flatwise engaging the trailing surface 23 on the insert and its opposite wedging surface flatwise engaging a reaction surface 36 on the body which is defined by the recess and which obliquely opposes the circumferential locating surface 18. The clamping screw 34 extends through the wedge 35 and is threaded substantially radially into the front body member 6. Preferably each of the abutment elements 31 on the rear body member is so located that its front surface is engaged by a rear surface on a wedge 39 as well as by the rear relief surface 25 on the insert engaged by the wedge, to provide steadying support for the wedge.

A face milling cutter of this invention that has carbide cutting inserts, as is preferred, should operate at a relatively high rotational speed. When installed on the widely used Bridgeport milling machine, which has provision for rotational speed adjustment, the machine should be operated at the highest rotational speed to which it can be set; and here again the present invention flies in the face of the accepted "rules" because heretofore that highest speed setting has seldom or never been used on most Bridgeport machines.

From the foregoing description taken with the accompanying drawings it will be apparent that this invention provides an improved face milling cutter body capable of use with indexable cutting inserts having any of a wide range of lead angles, and wherein such inserts can be quickly and easily installed without tedious trial and error adjustments, even after resharpening; and it will further apparent that the milling cutter of this invention cuts fast with relatively low power consumption but nevertheless produces a very smoothly finished cut surface without the need for a specialized sweep wiper insert.

What is claimed is:

1. A cutter body for a face milling cutter that has a predetermined effective diameter and is adapted for rotation about an axis in a predetermined direction; said cutter body being adapted to have a plurality of identical indexable cutting inserts of a predetermined inscribed circle size detachably secured to it at circumferentially spaced intervals around said axis, each said insert having flat relatively large leading and trailing surfaces that are opposite and parallel to one another and having four identical small, flat relief surfaces, each at an acute angle to said leading surface, which intersect said leading surface to define thereon four identical straight edges, each said edge extending at right angles to two of the others and being tangent to an imaginary inscribed circle of said size; said cutter body comprising a front member which is substantially concentric to said axis and which has a front face at a front end thereof that defines a first plane normal to said axis, a rear face which is opposite said front face and is spaced axially rearwardly therefrom, a peripheral surface, and a plurality of identical recesses, one for each insert, that are spaced apart at circumferential intervals and each of which opens radially through said peripheral surface, axially forwardly through said front face and axially rearwardly through said rear face; said cutter body further comprising a rear member separable from said front member and from a spindle by which the cutter body can be carried for rotation, and releasable locking means cooperating with said front and rear members to detachably fix the rear member in concentric axially rearwardly adjacent relationship to the front member and in a predetermined rotational position relative to the front member;

said cutter body being characterized by:

A. said front member
   (1) having every portion of its said peripheral surface at a radial distance from said axis that is substantially smaller than one-half of said effective diameter,
   (2) having on its said rear face flat rearwardly facing surface areas which are all contained in a second plane normal to said axis that is spaced rearwardly from said first plane by a distance not substantially greater than the diameter of said inscribed circle;

B. each said recess defining on said front member a flat circumferential locating surface against which one of said relatively large surfaces on the insert for the recess is flatwise engageable to establish the circumferential position and rake angles of that insert, said circumferential locating surface
  (1) facing substantially in one circumferential direction, and
  (2) being oblique to, and having an intersection with, an imaginary plane that contains said axis and extends radially therefrom to that intersection, the inclination of the circumferential locating surface relative to that plane being radially outward and in said direction of rotation for positive radial rake, and axially forward and in said direction of rotation for positive axial rake;

C. each said recess further defining on said front member a flat, elongated radial locating surface which faces away from said axis and against which one of said relief surfaces on the insert is flatwise engageable to establish the radial position of the insert, said radial locating surface
  (1) extending lengthwise substantially from said front face to said rear face,
  (2) being lengthwise substantially parallel to said axis, and
  (3) being spaced from said axis by a radial distance substantially equal to one-half of said effective diameter minus the diameter of said inscribed circle;

D. said rear member having a flat front face which is held engaged against said rearwardly facing surface areas on the front member by said releasable locking means;

E. said rear member further having thereon, at circumferentially spaced intervals therearound, a plurality of abutment elements, one for each said recess, each said abutment element
  (1) projecting forwardly beyond said flat front face of the rear member,
  (2) having thereon a flat, forwardly facing axial locating surface engageable by another of said relief surfaces on the insert for its recess to establish the axial position of the insert relative to the front member, and
  (3) having its axial locating surface contained in a third plane normal to said axis which also contains the axial locating surfaces on the other abutment elements and which is spaced to the rear of said first plane by a distance smaller than the diameter of said inscribed circle;

F. said cutter body further comprising a plurality of insert clamps, one for each of said recesses,
  (1) each comprising a screw having threaded engagement with said front member, and
  (2) each arranged for forcefully but releasably engaging the other of said large surfaces on the insert for the recess to clampingly confine the insert against the circumferential locating surface defined by its recess, to thus releasably fix the insert relative to the cutter body; and G. said releasable locking means comprising
  (1) one of said body members being annular to have a coaxial central aperture,
  (2) the other of said body members having a reduced diameter concentric neck portion projecting therefrom that is received with a close axially slidable fit in said central aperture in said one body member, and
  (3) a plurality of further screws that extend parallel to said axis and are disposed at circumferentially spaced intervals around said central aperture and said neck portion, each having engagement with both of said body members.

2. A cutter body for a face milling cutter that has a predetermined effective diameter and is adapted for rotation about an axis in a predetermined direction; said cutter body being adapted to have a plurality of identical indexable cutting inserts of a predetermined inscribed circle size detachably secured to it at circumferentially spaced intervals around said axis, each said insert having flat relatively large leading and trailing surfaces that are opposite and parallel to one another and having four identical small, flat relief surfaces, each at an acute angle to said leading surface, which intersect said leading surface to define thereon four identical straight edges, each said edge extending at right angles to two of the others and being tangent to an imaginary inscribed circle of said size; said cutter body comprising a rear member and a front member, said rear member being separable from said front member and from a spindle by which the cutter body can be carried for rotation, said front member being substantially concentric to said axis and having a front face at a front end thereof that defines a first plane normal to said axis, a rear face which is opposite said front face and is spaced axially rearwardly therefrom, a peripheral surface, and a plurality of identical recesses, one for each insert, that are spaced apart at circumferential intervals and each of which opens radially through said peripheral surface, axially forwardly through said front face and axially rearwardly through said rear face;

said cutter body being characterized by:

A. said front member
  (1) having every portion of its said peripheral surface at a radial distance from said axis that is substantially smaller than one-half of said effective diameter,
  (2) having on its said rear face flat rearwardly facing surface areas which are all contained in a second plane normal to said axis that is spaced rearwardly from said first plane by a distance not substantially greater than the diameter of said inscribed circle;

B. each said recess defining on said front member a flat circumferential locating surface against which one of said relatively large surfaces on the insert for the recess is flatwise engageable to establish the circumferential position and rake angles of that insert, said circumferential locating surface
  (1) facing substantially in one circumferential direction, and
  (2) being oblique to, and having an intersection with, an imaginary plane that contains said axis and extends radially therefrom to that intersection, the inclination of the circumferential locating surface relative to that plane being radially outward and in said direction of rotation for positive radial rake, and axially forward and in said direction of rotation for positive axial rake;

C. each said recess further defining on said front member a flat, elongated radial locating surface which faces away from said axis and against which one of said relief surfaces on the insert is flatwise engageable to establish the radial position of the insert, said radial locating surface
- (1) extending lengthwise substantially from said front face to said rear face,
- (2) being lengthwise substantially parallel to said axis, and
- (3) being spaced from said axis by a radial distance substantially equal to one-half of said effective diameter minus the diameter of said inscribed circle;

D. said rear member having a flat front face which is flatwise engageable against said rearwardly facing surface areas on the front member;

E. releasable locking means cooperating with said front and rear members to detachably fix the rear member concentrically to the front member, in a predetermined rotational position relative thereto and with said flat front face on the rear member flatwise engaging said rearwardly facing surface area on the front member;

F. said rear member further having thereon, at circumferentially spaced intervals therearound, a plurality of abutment elements, one for each said recess, each said abutment element
- (1) projecting forwardly beyond said flat front face of the rear member,
- (2) having thereon a flat, forwardly facing axial locating surface engageable by another of said relief surfaces on the insert for its recess to establish the axial position of the insert relative to the front member, and
- (3) having its axial locating surface contained in a third plane normal to said axis which also contains the axial locating surfaces on the other abutment elements and which is spaced to the rear of said first plane by a distance smaller than the diameter of said inscribed circle; and G. said cutter body further comprising a plurality of insert clamps, one for each of said recesses,
- (1) each comprising a screw having threaded engagement with said front member, and
- (2) each arranged for forcefully but releasably engaging the other of said large surfaces on the insert for the recess to clampingly confine the insert against the circumferential locating surface defined by its recess, to thus releasably fix the insert relative to the cutter body.

3. The cutter body of claim 2, wherein said releasable locking means is characterized by:
- (1) said front member having a reduced diameter concentric neck portion that projects rearwardly beyond its said rear face;
- (2) said rear member being annular and having a close axially slidable fit around said neck portion; and
- (3) a plurality of screws that extend forwardly parallel to said axis through the rear member, at circumferentially spaced intervals around the same, and are threaded into the front member.

* * * * *